J. GROAT.
Smut Machine.
No. 3,817.
Patented Nov. 9, 1844.
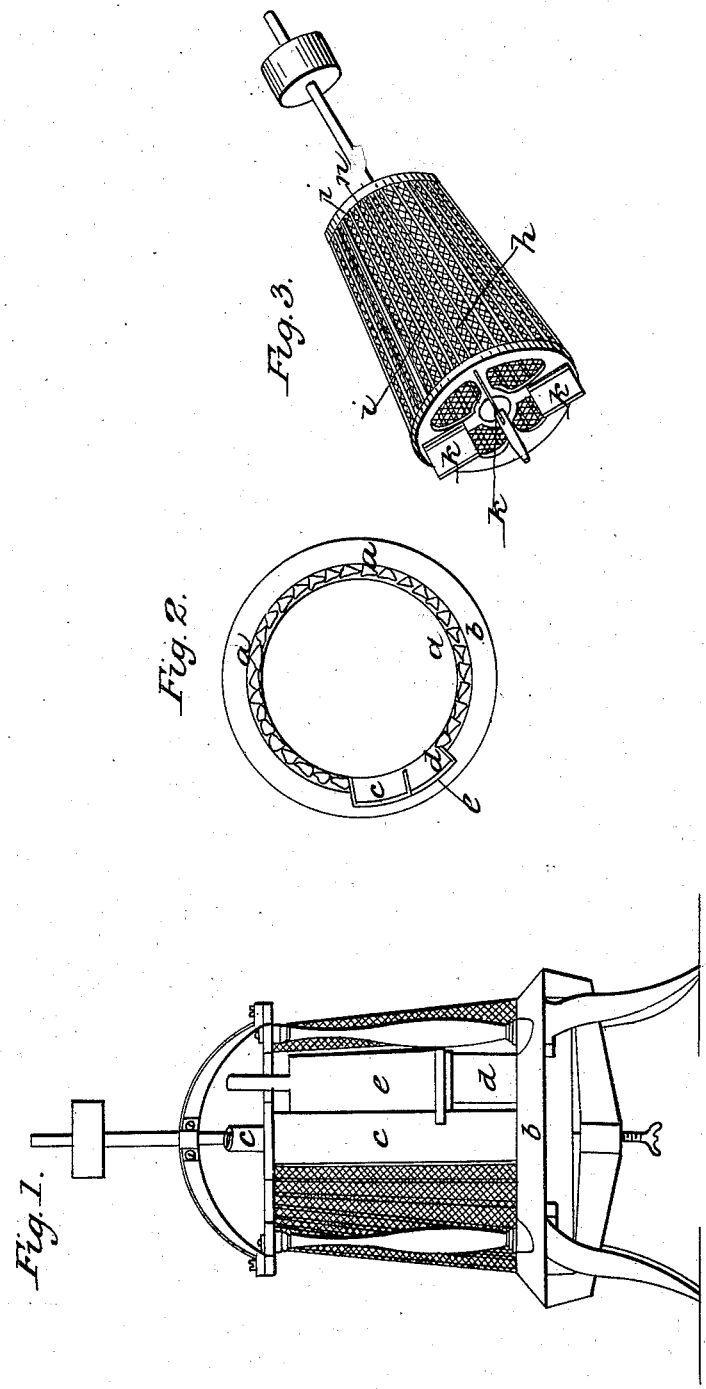

UNITED STATES PATENT OFFICE.

JACOB GROAT, OF TROY, NEW YORK.

SMUT-MACHINE.

Specification of Letters Patent No. 3,817, dated November 9, 1844.

*To all whom it may concern:*

Be it known that I, JACOB GROAT, of Troy, in the county of Rensselaer and State of New York, have invented a new and useful Improvement in Smut-Machines; and I do hereby declare that the following is a full, clear, and exact description thereof, reference being had to the accompanying drawing, which forms a part of this specification, in which—

Figure 1, is a side elevation. Fig. 2, is a section horizontally through the concave; Fig. 3 runner or cylinder detached.

The nature of my invention consists in forming the eduction tube or reservoir with a long opening closed by a slide which regulates the discharge of the grain, and in placing the triangular bars diagonally to the cylinder so as to present one corner to act on the grain and placing wings between the files on the cylinder.

The construction is as follows: The concave is of a conical form, the bars of which are triangular and tapering; they are set with one edge inclining in toward the cylinder without being turned quite enough to make either side radial from the center; this position is shown in Fig. 2.

$a, a,$ are sections of the bars; $b,$ the lower head, into a groove in which the bars $a$ are inserted; on one side there is a double spout, one half of which $c$ is for admitting the grain to be cleaned, the other for the grain to leave the machine from. The section of these is shown in Fig. 2 and an outside view in Fig. 1, denoted by the same letters.

The spout $c,$ connects above with the hopper containing the grain and not represented in the drawing. From thence the grain passes around the machine to the spout $d,$ either obliquely downward or horizontal as the cylinder is set. When it enters the spout $d$ it falls down and if not let out it fills it and continues to be acted on at pleasure for any length of time. There is an oblong opening into the side of this spout that can be wholly or partially closed by a sliding gate $e,$ and as this is more or less opened for the escape of the grain so will the grain be acted on by the rubbers.

The cylinder, shown separate at Fig. 3, is formed of flat files $h,$ and wings $i,$ formed of thin pieces of metal alternating with each other, the wings $i,$ project a little beyond the files, below the bottom of the cylinder there are fans $k,$ the runner is supported and runs like those in common use.

Having thus fully described my improvements what I claim therein as my invention is—

The regulating reservoir or spout $d,$ constructed as above described, in combination with the cylinder and concave as herein specified.

JACOB GROAT.

Witnesses:
A. A. THOMPSON,
CHARLES H. HOWES.